United States Patent
Wu et al.

(10) Patent No.: US 12,472,173 B2
(45) Date of Patent: Nov. 18, 2025

(54) QUINOLINE DERIVATIVE AND ANTIBODY SOFT TISSUE SARCOMA COMBINATION THERAPY

(71) Applicant: CHIA TAI TIANQING PHARMACEUTICAL GROUP CO., LTD., Lianyungang (CN)

(72) Inventors: Di Wu, Changchun (CN); Huan Wang, Lianyungang (CN)

(73) Assignee: Chia Tai Tianqing Pharmaceutical Group Co., Ltd., Lianyungang (CN)

( * ) Notice: Subject to any disclaimer, the term of this patent is extended or adjusted under 35 U.S.C. 154(b) by 1044 days.

(21) Appl. No.: 17/610,212

(22) PCT Filed: May 11, 2020

(86) PCT No.: PCT/CN2020/089546
§ 371 (c)(1),
(2) Date: Nov. 10, 2021

(87) PCT Pub. No.: WO2020/228657
PCT Pub. Date: Nov. 19, 2020

(65) Prior Publication Data
US 2022/0313685 A1   Oct. 6, 2022

(30) Foreign Application Priority Data
May 10, 2019 (CN) .......................... 201910395694.6

(51) Int. Cl.
*A61K 31/4745* (2006.01)
*C07K 16/28* (2006.01)
*A61K 39/00* (2006.01)

(52) U.S. Cl.
CPC ...... *A61K 31/4745* (2013.01); *C07K 16/2803* (2013.01); *A61K 2039/505* (2013.01); *A61K 2039/545* (2013.01); *C07K 2317/76* (2013.01)

(58) Field of Classification Search
CPC .......... A61K 31/4745; A61K 2039/505; A61K 2039/545; A61K 2039/54; A61K 2039/55; A61K 31/4709; A61K 39/3955; C07K 16/2803; C07K 2317/76; C07K 16/2818; A61P 35/00
See application file for complete search history.

(56) References Cited

U.S. PATENT DOCUMENTS

2016/0326138 A1* 11/2016 Chen ...................... A61K 45/06
2022/0054475 A1*  2/2022 Chen .................. C07K 16/2818

FOREIGN PATENT DOCUMENTS

| CN | 105311029 A | 2/2016 |
| TW | 201813667 A | 4/2018 |
| WO | WO 2019070497 A1 | 4/2019 |

OTHER PUBLICATIONS

Chi Y et al. 11005 Phase II study of anlotinib for treatment of advanced soft tissues sarcomas. (Journal of Clinical Oncology 2016 34 15 supp). (Year: 2016).*
Yang S et al. Effect of JS001, a monoclonal antibody targeting programed death-1 (PD-1), on responses and disease control in patients with advanced or refractory alveolar soft part sarcoma: Results from a phase 1 trial. (Journal of Clinical Oncology 2018 36 15 supp). (Year: 2018).*
Bronto JM et al. Immunosarc: A collaborative Spanish (GEIS) and Italian (ISG) Sarcoma Groups phase I/II trial of sunitinib plus nivolumab in selected bone and soft tissue sarcoma subtypes—Results of the phase I part. (J Clin Oncol 2018 36 15 suppl). (Year: 2018).*
Shen G et al. Anlotinib: a novel multi-targeting tyrosine kinase inhibitor in clinical development. (Journal of Hematology & Oncology 2018 11, 120 1-11). (Year: 2018).*
Askins J et al. Drug-device co-packing solutions to enhance differentiation and improve experience. (ONdrugDelivery 2019 95 89-92) (Year: 2019).*
Clinical trial NCT01878448 (https://clinicaltrials.gov/study/NCT01878448) (Year: 2016).*
Clinical trial NCT02836834(https://clinicaltrials.gov/study/NCT02836834?tab=history&a=6#version-content-panel)(Year: 2017).*
Chi Y et al. Safety and Efficacy of Anlotinib, a Multikinase Angiogenesis Inhibitor, in Patients with Refractory Metastatic Soft-Tissue Sarcoma. (Clin Cancer Res (2018) 24 (21): 5233-5238.) (Year: 2018).*
Tawbi HE et al. Pembrolizumab in Advanced Soft Tissue and Bone Sarcomas: Results of SARC028, A Multicentre, Single arm, Phase 2 Trial. (Lancet Oncol. Oct. 4, 2017;18(11):1493-1501) (Year: 2017).*
Pollack SM et al. T-cell infiltration and clonality correlate with programmed cell death protein 1 and programmed death-ligand 1 expression in patients with soft tissue sarcomas. (Cancer 2017 123:3291-304) (Year: 2017).*
Zhang X et al. Multicenter phase II study of anlotinib and toripalimab in patients with advanced soft tissue sarcoma (STS) and bone sarcoma (BS). (Journal of Clinical Oncology 2025 43, 16_suppl, 11556) (Year: 2025).*
Wu F et al. Efficacy of toripalimab in combination with anlotinib in recurrent undifferentiated pleomorphic sarcoma of the sinonasal region: a case report with biomarker analysis. (Front Immunol 2025 16:1541209) (Year: 2025).*

(Continued)

*Primary Examiner* — Karen A. Canella
*Assistant Examiner* — John J Skoko, III
(74) *Attorney, Agent, or Firm* — NIXON PEABODY LLP

(57) ABSTRACT

The present invention belongs to the pharmaceutical field, and provides a quinoline derivative and antibody soft tissue sarcoma combination therapy, specifically relating to a use of a therapeutically effective amount of a quinoline derivative compound I or a pharmaceutically acceptable salt thereof in combination with at least one antibody drug in preparing a drug used for treating soft tissue sarcoma. The chemical name of the quinoline derivative compound I is 1-[[[4-(4-fluoro-2-methyl-1H-indol-5-yl)oxy-6-methoxyquinolin-7-yl]oxy]methyl]cyclopropylamine.

15 Claims, No Drawings

(56) References Cited

OTHER PUBLICATIONS

Yong L et al. Case Report: Two Cases of Soft-Tissue Sarcomas: High TMB as a Potential Predictive Biomarker for Anlotinib Combined With Toripalimab Therapy. (Front Immunol 2022 13:832593.) (Year: 2022).*

Liu H et al. Glycosylation-independent binding of monoclonal antibody toripalimab to FG loop of PD-1 for tumor immune checkpoint therapy. Mabs 2019 11(4):681-690. (Year: 2019).*

International Search Report in International Application No. PCT/CN2020/089546, mailed Aug. 13, 2020 (6 pages).

Yang et al. "Effect of JS001, a monoclonal antibody targeting programed death-1 (PD-1), on responses and disease control in patients with advanced or refractory alveolar soft part sarcoma: Results from a phase 1 trial." Journal of Clinical Oncology, 36:15, May 11, 2018. p. 11572.

Chi et al. "Safety and efficacy of anlotinib, a multikinase angiogenesis inhibitor, in patients with refractory metastatic soft-tissue sarcoma." Clinical Cancer Research, 24:21, Jun. 12, 2018. pp. 5233-5238.

Liu W. et al.: "Advances of systemic treatment for adult soft-tissue sarcoma", Chinese Clinical Oncology, vol. 7, No. 4, pp. 1-13, Aug. 1, 2018.

Tang L. et al.: "Anlotinib inhibits synovial sarcoma by targeting GINS1: a novel downstream target oncogene in progression of synovial sarcoma", Clinical and Translational Oncology, vol. 21, No. 12, pp. 1624-1633, Apr. 8, 2019, Springer Italia SRL, Italy, Spain.

Extended European Search Report in application No. EP 20805823.0, dated Dec. 16, 2022.

* cited by examiner

QUINOLINE DERIVATIVE AND ANTIBODY SOFT TISSUE SARCOMA COMBINATION THERAPY

CROSS-REFERENCE TO RELATED APPLICATIONS

The present application is a U.S. National Stage Entry of International Application No. PCT/CN2020/089546 filed on May 11, 2020, which claims priority and benefit to Chinese Patent Application No. 201910395694.6 filed with China National Intellectual Property Administration on May 10, 2019, each of which is hereby incorporated by reference in its entirety.

TECHNICAL FIELD

The present application belongs to the technical field of medicines, and relates to combination therapy for a soft tissue sarcoma. In particular, the present application relates to use of a quinoline derivative in combination with an antibody for treating a soft tissue sarcoma.

BACKGROUND

Soft tissue sarcomas (STS) are a group of malignant tumors derived from connective tissues such as mucus, fiber, fat, smooth muscle, synovium, striated muscle, mesothelium, blood vessels and lymphatic vessels. Currently, there are 19 tissue types and more than 100 different subtypes of soft tissue sarcomas, and one of the most common types of STS is undifferentiated pleomorphic sarcoma (UPS), which was previously named as malignant fibrous histiocytoma (MFH). MFH was discovered and proposed by O'Brien and Stout in 1964, and it is essentially UPS whose histological source and differentiation direction are still unclear. MFH is a malignant tumor originating from mesenchymal tissue and is more prevalent in limbs, trunk, head and neck and retroperitoneum gaps, and it features deeper position, high tumor grade, high malignancy degree, proneness to recurrence after operation, and no typical image characteristics. UPS lacks a specific differentiation direction, and its diagnosis belongs to diagnosis of exclusion, namely excluding UPS-like diseases with a definite differentiation direction. Compared to other types of STS patients, UPS patients often have a lower 5-year survival rate, typically 30% to 50%.

Tyrosine kinase is a group of enzymes which catalyze the phosphorylation of tyrosine residues in proteins. It plays an important role in intracellular signal transduction, takes part in regulation, signaling and development of normal cells, and is closely related to proliferation, differentiation, migration and apoptosis of tumor cells. Many receptor tyrosine kinases are associated with tumorigenesis and can be classified into epidermal growth factor receptor (EGFR), platelet-derived growth factor receptor (PDGFR), vascular endothelial growth factor receptor (VEGFR), fibroblast growth factor receptor (FGFR) and the like according to the structure of extracellular domain.

WO2008112407 disclosed in Example 24 a quinoline derivative tyrosine kinase inhibitor 1-[[[4-(4-fluoro-2-methyl-1H-indol-5-yl)oxy-6-methoxyquinolin-7-yl]oxy] methyl]cyclopropylamine (i.e., anlotinib) and a preparation method thereof, and the inhibitor has a structural formula as shown in formula I:

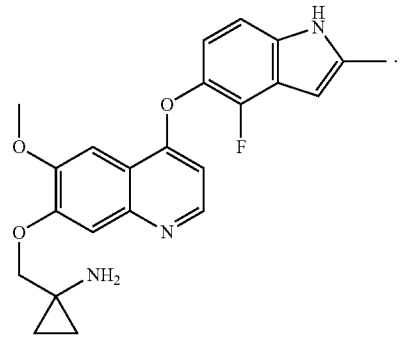

formula I

The innate immune system, which contains T lymphocytes, has a strong anti-cancer capacity featuring broad capacity and precise specificity, thus responding to a variety of tumor antigens. Emerging cancer immunotherapy enhances anti-tumor immune response by adoptive transfer of activated effector cells, immunization against relevant antigens, or providing non-specific immunostimulants. In the last 20 years, researchers have struggled to develop specific immune checkpoint inhibitors and expected to provide new immunotherapeutic protocols for treating cancer, but the therapeutic efficacy is poor due to tumor immune tolerance and escape. Therefore, it is important in terms of theoretical significance and application value to break the established immune tolerance of the body to the tumor cells through the combination use of the small-molecule anti-tumor compound and the anti-PD-1/PD-L1 antibody.

SUMMARY

In one aspect, the present application provides a pharmaceutical combination for use in treating a soft tissue sarcoma, which comprises (i) a compound of formula I or a pharmaceutically acceptable salt thereof, and (ii) at least one antibody drug:

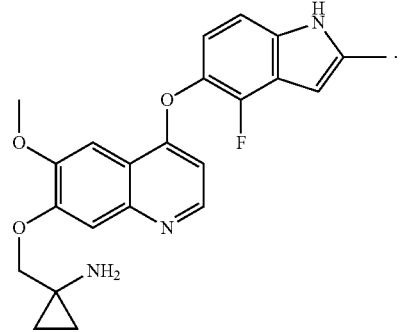

formula I

In another aspect, the present application further provides use of a pharmaceutical combination for preparing a medicament for use in treating a soft tissue sarcoma.

In yet another aspect, the present application further provides a method for treating a soft tissue sarcoma, which comprises administering to a subject in need thereof a therapeutically effective amount of the pharmaceutical combination disclosed herein. The pharmaceutical combination comprises (i) a compound of formula I or a pharmaceutically acceptable salt thereof, and (ii) at least one antibody drug.

In one aspect, the present application provides a pharmaceutical combination for use in treating a soft tissue sarcoma, which comprises: (i) a compound of formula I or a pharmaceutically acceptable salt thereof, and (ii) at least one antibody drug.

In some embodiments of the present application, the pharmaceutical combination comprises: (i) a pharmaceutical composition of the compound of formula I or the pharmaceutically acceptable salt thereof, and (ii) a pharmaceutical composition of the at least one antibody drug.

In some embodiments, provided is a pharmaceutical combination for use in treating a soft tissue sarcoma, which comprises: (i) the compound of formula I or the pharmaceutically acceptable salt thereof, and (ii) an inhibitor for interaction between PD-1 receptor and its ligand PD-L1; optionally, the pharmaceutical combination is used in combination with radiation therapy. In some embodiments, provided is a pharmaceutical combination for use in treating a soft tissue sarcoma, which comprises: (i) the compound of formula I or the pharmaceutically acceptable salt thereof, and (ii) an inhibitor for platelet-derived growth factor receptor α (PDGFR-α); optionally, the pharmaceutical combination is used in combination with radiation therapy. In some specific embodiments, provided is a pharmaceutical combination for use in treating a soft tissue sarcoma, which comprises: (i) the compound of formula I or the pharmaceutically acceptable salt thereof, and (ii) toripalimab. In some embodiments, provided is a pharmaceutical combination for use in treating a soft tissue sarcoma, which comprises: (i) the compound of formula I or the pharmaceutically acceptable salt thereof, and (ii) pembrolizumab. In some specific embodiments, provided is a pharmaceutical combination for use in treating a soft tissue sarcoma, which comprises: (i) the compound of formula I or the pharmaceutically acceptable salt thereof, and (ii) olaratumab.

In some specific embodiments, provided is a pharmaceutical combination for use in treating a soft tissue sarcoma, which comprises: (i) a composition of the compound of formula I or the pharmaceutically acceptable salt thereof in a single dose of 6 mg, 8 mg, 10 mg and/or 12 mg, and (ii) a composition of toripalimab in a single dose of 120-600 mg.

In some specific embodiments, provided is a pharmaceutical combination for use in treating a soft tissue sarcoma, which comprises: (i) a composition of the compound of formula I or the pharmaceutically acceptable salt thereof in a single dose of 6 mg, 8 mg, 10 mg and/or 12 mg, and (ii) a composition of toripalimab in a single dose of 120, 140, 160, 180, 200, 240, 300, 360, 400, 480 and/or 600 mg.

In some embodiments, provided is a pharmaceutical combination for use in treating a soft tissue sarcoma, which comprises: (i) the compound of formula I or the pharmaceutically acceptable salt thereof, and (ii) toripalimab, wherein toripalimab is formulated into a pharmaceutical composition suitable for administration to a patient 240 mg in a single dose or multiple doses at first administration, and the compound of formula I or the pharmaceutically acceptable salt thereof is formulated into a pharmaceutical composition suitable for administration to a patient a single dose of 6 mg, 8 mg, 10 mg and/or 12 mg daily for 14 consecutive days.

In another aspect, the present application provides use of a pharmaceutical combination for preparing a medicament for use in treating a soft tissue sarcoma, the pharmaceutical combination comprising: (i) a compound of formula I or a pharmaceutically acceptable salt thereof, and (ii) at least one antibody drug; optionally, the pharmaceutical combination is used in combination with radiation therapy.

In yet another aspect, the present application provides a method for treating a soft tissue sarcoma, which comprises: administering to a subject in need thereof a therapeutically effective amount of (i) a compound of formula I or a pharmaceutically acceptable salt thereof, and (ii) at least one antibody drug.

In some embodiments, the present application further provides a method for treating a soft tissue sarcoma, which comprises: administering to a subject in need thereof a therapeutically effective amount of the compound of formula I or the pharmaceutically acceptable salt thereof, and a therapeutically effective amount of an inhibitor for interaction between PD-1 receptor and its ligand PD-L1; optionally, the method comprises employing radiation therapy. In some embodiments, the inhibitor for interaction between PD-1 receptor and its ligand PD-L1 is an antibody that binds to programmed death receptor 1 (PD-1) and/or an antibody that inhibits PD-1 activity or an antigen-binding portion thereof. For example, the inhibitor is an anti-PD-1 antibody or an anti-PD-L1 antibody. In some embodiments, the antibody drug is an anti-PD-1 antibody and an anti-PD-L1 antibody.

The present application also provides a method for treating an entity having a soft tissue sarcoma, which comprises: (i) measuring the level of PD-1 and/or PD-L1 in a sample from the entity, wherein the entity is PD-1 and/or PD-L1 positive; and (ii) administering to the entity a therapeutically effective amount of a compound of formula I or a pharmaceutically acceptable salt thereof and a therapeutically effective amount of at least one anti-PD-1 antibody and/or anti-PD-L1 antibody or an antigen-binding portion thereof.

In some embodiments, the soft tissue sarcoma includes a soft tissue sarcoma that has not previously been treated with a tyrosine kinase inhibitor (TKI). In some embodiments, the tyrosine kinase inhibitor is, for example, anlotinib, imatinib, sunitinib, pazopanib or a similar drug.

In some embodiments, the soft tissue sarcoma includes a soft tissue sarcoma that has not previously been treated with immunotherapy. In some embodiments, the soft tissue sarcoma includes a soft tissue sarcoma that has not previously been treated with an inhibitor for interaction between PD-1 receptor and its ligand PD-L1. In some embodiments, the soft tissue sarcoma includes a soft tissue sarcoma that has not previously been treated with a CTLA-4 inhibitor.

The present application provides a method for treating an entity having a soft tissue sarcoma. In certain embodiments, the entity is, for example, a patient diagnosed with undifferentiated pleomorphic sarcoma or alveolar soft-part sarcoma. For example, in certain embodiments, the soft tissue sarcoma is a recurrent soft tissue sarcoma. In certain embodiments, the soft tissue sarcoma is a metastatic soft tissue sarcoma. In certain embodiments, the soft tissue sarcoma is a refractory soft tissue sarcoma. In certain embodiments, the soft tissue sarcoma is an unresectable soft tissue sarcoma. In some specific embodiments, the soft tissue sarcoma described herein is undifferentiated pleomorphic sarcoma. In some specific embodiments, the soft tissue sarcoma described herein is unresectable and/or metastatic undifferentiated pleomorphic sarcoma. In other specific embodiments, the soft tissue sarcoma described herein is alveolar soft-part sarcoma. In some specific embodiments, the soft tissue sarcomas described herein include those specified in the 2013 WHO classification, including but not limited to angiosarcoma, fibrosarcoma, leiomyosarcoma, liposarcoma, rhabdomyosarcoma, synovial sarcoma, dermatofibrosarcoma protuberan, malignant peripheral nerve sheath tumor, clear cell sarcoma, malignant mesenchymoma, epithelioid sarcoma, undifferentiated sarcoma and gastrointestinal stromal tumor.

In some embodiments of the present application, the entity has previously been treated with surgery, chemotherapy and/or radiation therapy. In some specific embodiments, the entity is one who has recurrence of disease progression after achieving complete response following surgery, chemotherapy, and/or radiation therapy. In some specific embodiments, the entity is one that has failed to achieve complete response or partial response following surgery, chemotherapy and/or radiation therapy.

In some embodiments of the present application, the entity has not previously been treated with systemic chemotherapy. In some embodiments, the entity has previously been treated with surgery, radiation therapy, induction chemotherapy, concurrent chemotherapy and/or adjuvant chemotherapy. In some specific embodiments, the entity has not previously been treated with systemic chemotherapy but has been treated with surgery, radiation therapy, induction chemotherapy, concurrent chemotherapy and/or adjuvant chemotherapy. In some specific embodiments, the entity has recurrence of disease progression after achieving complete response following surgery, radiation therapy, induction chemotherapy, concurrent chemotherapy and/or adjuvant chemotherapy. In some specific embodiments, the entity has failed to achieve complete response or partial response following surgery, radiation therapy, induction chemotherapy, concurrent chemotherapy and/or adjuvant chemotherapy. In some specific embodiments, the cancer metastasizes after the entity has been treated with surgery, radiation therapy, induction chemotherapy, concurrent chemotherapy and/or adjuvant chemotherapy.

In some embodiments of the present application, the anti-PD-1 antibody or anti-PD-L1 antibody and the compound of formula I or the pharmaceutically acceptable salt thereof are each in the form of a pharmaceutical composition, and can be administered simultaneously, sequentially or at intervals.

In some embodiments of the present application, the anti-PD-1 antibody or anti-PD-L1 antibody and the compound of formula I or the pharmaceutically acceptable salt thereof are administered at intervals. In some embodiments, the anti-PD-1 antibody or anti-PD-L1 antibody and the compound of formula I or the pharmaceutically acceptable salt thereof are each administered according to the same or different administration regimens. In some embodiments, the anti-PD-1 antibody or anti-PD-L1 antibody and the compound of formula I or the pharmaceutically acceptable salt thereof are each administered according to different administration regimens.

In some embodiments of the present application, for the use or treatment methods disclosed herein, the anti-PD-1 antibody or anti-PD-L1 antibody can be administered once every week (q1w), once every 2 weeks (q2w), once every 3 weeks (q3w) or once every 4 weeks (q4w). In a specific embodiment, the anti-PD-1 antibody or anti-PD-L1 antibody is administered once every 3 weeks.

The compound of formula I or the pharmaceutically acceptable salt thereof can be administered at a dose of 6 mg, 8 mg, 10 mg or 12 mg once daily according to an administration regimen of consecutively 2-week treatment and then 1-week interruption, and/or according to an administration regimen of consecutively 2-week treatment and then 2-week interruption.

In some embodiments, the anti-PD-1 antibody or anti-PD-L1 antibody and the compound of formula I or the pharmaceutically acceptable salt thereof each have the same or different treatment cycles. In some specific embodiments, the anti-PD-L1 antibody or anti-PD-L1 antibody and the compound of formula I or the pharmaceutically acceptable salt thereof have the same treatment cycle, e.g., a 1-week treatment cycle, 2-week, 3-week or 4-week treatment cycle.

In some specific embodiments, the first treatment cycle is 4 weeks, the compound of formula I or the pharmaceutically acceptable salt thereof is administered according to a regimen of consecutively 2-week treatment and then 2-week interruption, and the anti-PD-1 antibody or anti-PD-L1 antibody is administered once on day 8 of the first treatment cycle. In some specific embodiments, from the second treatment cycle, each treatment cycle is three weeks, the compound of formula I or the pharmaceutically acceptable salt thereof is administered according to a regimen of consecutively 2-week treatment and then 1-week interruption, and the anti-PD-1 antibody or anti-PD-L1 antibody is administered on the first day of the treatment cycle.

In some embodiments of the treatment method disclosed herein, the toripalimab can be administered to the patient at a dose of 120-600 mg, for example at a dose of 120, 140, 160, 180, 200, 240, 300, 360, 400, 480 and/or 600 mg.

Compound of Formula I or Pharmaceutically Acceptable Salt Thereof

In the present application, the chemical name of the compound of formula I is 1-[[[4-(4-fluoro-2-methyl-1H-indol-5-yl)oxy-6-methoxyquinolin-7-yl]oxy]methyl]cyclopropylamine, which has the following structural formula:

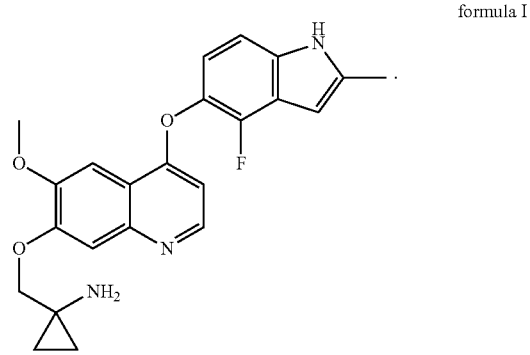 [SMILES: COc1cc2c(Oc3ccc4[nH]c(C)cc4c3F)ccnc2cc1OCC1(N)CC1]

formula I

In the present application, the compound of formula I can be administered in its free base form, or in the form of a salt, a hydrate, or a prodrug that converts in vivo into the free base form of the compound of formula I. The pharmaceutically acceptable salt of the compound of formula I can be generated from various organic and inorganic acids according to methods well known in the art. The "pharmaceutically acceptable salt" includes, but is not limited to, acid addition salts of inorganic acids such as hydrochloric acid, hydrobromic acid, sulfuric acid, nitric acid and phosphoric acid, or acid addition salts of organic acids such as acetic acid, trifluoroacetic acid, propionic acid, hexanoic acid, heptanoic acid, cyclopentane propionic acid, glycolic acid, pyruvic acid, lactic acid, malonic acid, succinic acid, malic acid, maleic acid, fumaric acid, tartaric acid, citric acid, benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, p-toluenesulfonic acid, 3-phenylpropionic acid, trimethylacetic acid, t-butylacetic acid, dodecyl sulfuric acid, gluconic acid, glutamic acid, hydroxynaphthoic acid, salicylic acid, and stearic acid. In some embodiments, the pharmaceutically acceptable salt of the compound of formula I is in the form of a hydrochloride. In some embodiments, the pharmaceutically acceptable salt of the compound of formula I is in the form of a monohydrochloride. In some embodiments, the pharmaceutically acceptable salt of the compound of formula I is in the form of a dihydrochloride. In some embodiments, the hydrochloride of the compound of formula I is in the form of a crystal. In some embodiments, the pharmaceutically acceptable salt of the compound of formula I is in the form of a crystal of dihydrochloride. In some embodiments, the pharmaceutically acceptable salt of the compound of formula I is in the form of a maleate. In the present application, anlotinib refers to the compound of formula I in any case.

Unless otherwise stated, the dose of the compound of formula I or a salt thereof involved in present application is calculated based on the molecular weight of free base of the compound of formula I.

The administration regimen of the compound of formula I or the pharmaceutically acceptable salt thereof can be determined comprehensively depending on the activity and toxicity of the drug, tolerance of a patient, etc. In some embodiments, the drug is administered at intervals, wherein the administration at intervals comprises a treatment period and an interruption period, and the drug can be administered once or multiple times daily in the treatment period. In some embodiments, the ratio of the treatment period to the interruption period in days is 2:0.5-2:5, preferably 2:0.5-2:3, more preferably 2:0.5-2:2, and even more preferably 2:0.5-2:1. In some embodiments, the drug is administered for 2 weeks consecutively and then interrupted for 1 week. In certain specific embodiments, the compound of formula I or the pharmaceutically acceptable salt thereof is administered orally at a dose of 8, 10 and/or 12 mg once daily according to an administration regimen of consecutively 2-week treatment and then 1-week interruption.

Antibody Drugs

In some embodiments of the present application, targets of the antibody drug include, but are not limited to, any one or more of PD-1, PD-L1, cytotoxic T-lymphocyte antigen 4 (CTLA-4), platelet-derived growth factor receptor α (PDGFR-α), vascular endothelial growth factor (VEGF), human epidermal growth factor receptor-2 (HER2), epidermal growth factor receptor (EGFR), ganglioside GD2, B cell surface protein CD20, B cell surface protein CD52, B cell surface protein CD38, B cell surface protein CD319, B cell surface protein CD30 and B cell surface protein CD19/CD3.

In some embodiments, the antibody drug is an inhibitor for interaction between PD-1 receptor and its ligand PD-L1. In some embodiments, the antibody drug is a cytotoxic T-lymphocyte antigen 4 (CTLA-4) inhibitor. In some embodiments, the antibody drug is a platelet-derived growth factor receptor α (PDGFR-α) inhibitor.

In some embodiments, the inhibitor for interaction between PD-1 receptor and its ligand PD-L1 is an antibody that binds to programmed death receptor 1 (PD-1) and/or an antibody that inhibits PD-1 activity or an antigen-binding portion thereof, or an antibody that binds to programmed death receptor 1 (PD-L1) and/or an antibody that inhibits PD-L1 activity or an antigen-binding portion thereof. For example, the inhibitor is an anti-PD-1 antibody or an anti-PD-L1 antibody. In some specific embodiments, the antibody or the antigen-binding portion thereof is (a) a monoclonal antibody or an antigen-binding fragment thereof that specifically binds to human PD-1 and blocks the binding of human PD-L1 to human PD-1; or (b) a monoclonal antibody or an antigen-binding fragment thereof that specifically binds to human PD-L1 and blocks the binding of human PD-L1 to human PD-1.

In some embodiments, the antibody drug is an anti-PD-1 antibody and an anti-PD-L1 antibody.

In some embodiments, the anti-PD-1 or anti-PD-L1 antibody is an anti-PD-1 or anti-PD-L1 monoclonal antibody.

In some embodiments, the anti-PD-1 or anti-PD-L1 antibody is a human or murine antibody.

In some embodiments, the anti-PD-1 antibody can be selected from any one or more of the group consisting of nivolumab, pembrolizumab, durvalumab, toripalimab (JS-001), sintilimab (IBI308), camrelizumab, tislelizumab (BGB-A317), AK105 (Akeso Bioscience), genolimzumab (GB226), lizumab (LZM009), HLX-10, BAT-1306, AK103 (HX008), AK104 (Akeso Bioscience), CS1003, SCT-I10A, F520, SG001 and GLS-010.

In some embodiments, the anti-PD-L1 antibody can be selected from any one or more of the group consisting of atezolizumab, avelumab, durvalumab, KL-A167, SHR-1316, BGB-333, JS003, STI-A1014 (ZKAB0011), KN035, MSB2311, HLX-20 and CS-1001.

In some specific embodiments, the anti-PD-1 antibody is toripalimab.

In some specific embodiments, the anti-PD-1 antibody is pembrolizumab.

In some embodiments, the cytotoxic T-lymphocyte antigen 4 (CTLA-4) inhibitor is an anti-CTLA-4 antibody. In some specific embodiments, the anti-CTLA-4 antibody is an anti-CTLA-4 monoclonal antibody.

In some embodiments, the anti-CTLA-4 antibody can be selected from any one or more of the group consisting of ipilimumab, tremelimumab, AGEN-1884, BMS-986249, BMS-986218, AK-104 and IBI310.

In some specific embodiments, the anti-CTLA-4 antibody is ipilimumab.

In some embodiments, the platelet-derived growth factor receptor α (PDGFR-α) inhibitor is an anti-PDGFRα antibody. In some specific embodiments, the anti-PDGFRα antibody is an anti-PDGFRα monoclonal antibody.

In some specific embodiments, the anti-PDGFRα antibody is olaratumab.

In some specific embodiments, the antibody drug may further include, but is not limited to, any one or more of bevacizumab, ramucirumab, pertuzumab, trastuzmab, cotuximab, nimotuzumab, panitumumab, necitumumab, dinutuximab, rituximab, ibritumomab, ofatumumab, obinutuzumab, alemtuzumab, daratumumab, gemtuzumab, elotuzumab, brentuximab, inotuzumab ozogamicin and blinatumomab.

Soft Tissue Sarcomas

The histological classification of the soft tissue sarcomas described herein includes, but is not limited to, undifferentiated pleomorphic sarcoma (also referred to as malignant fibrous histiocytoma), angiosarcoma, desmoid tumor, fibrosarcoma, gastrointestinal stromal tumor, Kaposi's sarcoma, leiomyosarcoma, liposarcoma, rhabdomyosarcoma, synovial sarcoma, dermatofibrosarcoma protuberan, nerve sheath tumor, malignant peripheral nerve sheath tumor, alveolar soft-part sarcoma, clear cell sarcoma, malignant mesenchymoma, epithelioid sarcoma, pulmonary alveolar soft-part sarcoma, dedifferentiated liposarcoma, myxoid liposarcoma, pleomorphic liposarcoma, mixed-type liposarcoma, adult fibrosarcoma, low grade fibromyxoid sarcoma, hyalinizing spindle cell tumor, sclerosing epithelioid fibrosarcoma, pericytic (perivascular) tumors, glomus tumor and variants, glomangiomatosis, malignant glomus tumor, myopericytoma, myofibroma, angioleiomyoma, embryonal rhabdomyosarcoma (including botryoid and anaplastic ones), alveolar rhabdomyosarcoma (including solid and anaplastic ones), pleomorphic rhabdomyosarcoma, spindle cell/sclerosing rhabdomyosarcoma, epithelioid haemangioendothelioma, angiosarcoma of soft tissue, epithelioid malignant peripheral nerve sheath tumor, malignant triton tumor, malignant granular cell tumor, synovial sarcoma NOS, synovial sarcoma (spindle cell), synovial sarcoma (biphasic), clear cell sarcoma of soft tissue, desmoplastic small round cell tumor, extra-renal rhabdoid tumor, neoplasms with perivascular epithelioid cell differentiation (PEComa), intimal sarcoma, undifferentiated/unclassified sarcomas, undifferentiated spindle cell sarcoma, undifferentiated round cell sarcoma, undifferentiated epithelioid cell sarcoma, desmoplastic small round cell tumor, low grade fibromyxoid sarcoma and borderline soft tissue tumor.

In some specific embodiments, the soft tissue sarcoma is undifferentiated pleomorphic sarcoma, alveolar soft-part sarcoma, angiosarcoma, fibrosarcoma, leiomyosarcoma, liposarcoma, rhabdomyosarcoma, synovial sarcoma, dermatofibrosarcoma protuberan, malignant peripheral nerve sheath tumor, clear cell sarcoma, malignant mesenchymoma, epithelioid sarcoma, undifferentiated sarcoma and gastrointestinal stromal tumor.

In some embodiments, the soft tissue sarcoma is undifferentiated pleomorphic sarcoma.

In some specific embodiments, the soft tissue sarcoma is alveolar soft-part sarcoma.

In the present application, clinical stages of the soft tissue sarcoma include, but are not limited to, locally advanced, and/or advanced (e.g., stage IIIB/IV) and/or metastatic soft tissue sarcomas. The metastatic soft tissue sarcomas include, but are not limited to, single metastasis, disseminated metastasis and diffuse metastasis of lesions, and the metastatic lesions include, but are not limited to, lymph nodes, pleura, bone, brain, pericardium, adrenal gland and liver. In some embodiments, the soft tissue sarcoma is soft tissue sarcoma with brain metastases. In some embodiments, the pharmaceutical combination is used for treating a soft tissue sarcoma. The soft tissue sarcoma may be a primary soft tissue sarcoma or secondary soft tissue sarcoma. In some embodiments, the soft tissue sarcoma is one that has progressed or recurred after being treated with at least one chemotherapy. In some embodiments, the soft tissue sarcoma is one that is intolerant to chemotherapy. In a preferred embodiment, the soft tissue sarcoma is one that has not previously been systemically treated. In some embodiments, the soft tissue sarcoma is undifferentiated pleomorphic sarcoma, and in other specific embodiments, the soft tissue sarcoma described herein is alveolar soft-part sarcoma.

Pharmaceutical Combination

Each component of the pharmaceutical combination described herein can optionally be used in combination with one or more pharmaceutically acceptable carriers, wherein the components can each independently comprise, or some or all of the components together comprise, a pharmaceutically acceptable carrier and/or an excipient. The components in the pharmaceutical combination described herein can be formulated separately, or some or all of the components are co-formulated. Preferably, the components of the pharmaceutical combination are formulated separately or are each formulated into a suitable pharmaceutical composition. In some embodiments, the pharmaceutical combination disclosed herein can be formulated into a pharmaceutical composition which is suitable for a single dose or multiple doses. In some specific embodiments, the pharmaceutical composition comprising the compound of formula I or the pharmaceutically acceptable salt thereof can be selected from a solid pharmaceutical composition including, but not limited to, a tablet or a capsule.

The components in the pharmaceutical combination disclosed herein can be administered separately, or some or all of the components are co-administered. The components in the pharmaceutical combination disclosed herein can be administered in a substantially asynchronous manner, or some or all of the components are administered in a substantially synchronous manner.

The components in the pharmaceutical combination disclosed herein can be administered independently, or some or all of the components are co-administered in proper routes including, but not limited to, oral administration or parenteral administration (by intravenous, intramuscular, topical or subcutaneous routes). In some embodiments, the components in the pharmaceutical combination disclosed herein can be administered independently, or some or all of the components are co-administered by means of oral administration or injection, for example, intravenous injection or intraperitoneal injection.

The components in the pharmaceutical combination disclosed herein can be independent suitable dosage forms, or some or all of the components are co-formulated in a suitable dosage form including, but not limited to, tablet, lozenge, pill, capsule (for example, hard capsule, soft capsule, enteric capsule and microcapsule), elixir, granule, syrup, injection (intramuscular, intravenous and intraperitoneal), granule, emulsion, suspension, solution, dispersant and dosage forms of slow-released preparations for oral or non-oral administration.

In some embodiments of the present application, the pharmaceutical combination is a fixed combination. In some embodiments, the fixed combination is in the form of a solid pharmaceutical composition or a liquid pharmaceutical composition.

In some embodiments of the present application, the pharmaceutical combination is a non-fixed combination. In some embodiments, the antibody drug and the compound of formula I or the pharmaceutically acceptable salt thereof in the unfixed combination are each in the form of a pharmaceutical composition.

In some embodiments, also provided is a kit of a pharmaceutical combination for use in treating a soft tissue sarcoma, which comprises (a) a first pharmaceutical composition comprising an anti-PD-1/PD-L1 antibody as an active ingredient, and (b) a second pharmaceutical composition comprising a compound of formula I or a pharmaceutically acceptable salt thereof as an active ingredient.

In some embodiments, also provided is a kit of a pharmaceutical combination for use in treating a soft tissue sarcoma, which comprises (a) a first pharmaceutical composition comprising an anti-CTLA-4 antibody as an active ingredient, and (b) a second pharmaceutical composition comprising a compound of formula I or a pharmaceutically acceptable salt thereof as an active ingredient. In some embodiments, also provided is a kit of a pharmaceutical combination for use in treating a soft tissue sarcoma, which comprises (a) a first pharmaceutical composition comprising an anti-PDGFRα antibody as an active ingredient, and (b) a second pharmaceutical composition comprising a compound of formula I or a pharmaceutically acceptable salt thereof as an active ingredient.

It is also an object of the present application to at least provide use of a PD-1 antagonist or a PD-L1 antagonist for preparing a medicament for use in treating a soft tissue sarcoma, wherein the antagonist is used in combination with a compound of formula I or a pharmaceutically acceptable salt thereof.

It is also an object of the present application to at least provide use of a compound of formula I or a pharmaceutically acceptable salt thereof for preparing a medicament for use in treating a soft tissue sarcoma, wherein the compound of formula I or the pharmaceutically acceptable salt thereof is used in combination with a PD-1 antagonist or a PD-L1 antagonist. In some embodiments, the PD-1 antagonist is a PD-1 monoclonal antibody or an antigen-binding fragment thereof that specifically binds to human PD-1 and blocks the binding of human PD-L1 to human PD-1, and/or the PD-L1 antagonist is a PD-L1 monoclonal antibody or an antigen-binding fragment thereof that specifically binds to human PD-L1 and blocks the binding of human PD-L1 to human PD-1.

The present application further provides a pharmaceutical pack comprising in one container a pharmaceutical composition comprising a compound of formula I or a pharmaceutically acceptable salt thereof and in a second container a pharmaceutical composition comprising a PD-1 antagonist or a PD-L1 antagonist.

Toripalimab

As used herein, toripalimab (JS-001, Junshi Biosciences) is a novel recombinant humanized anti-PD-1 monoclonal antibody injection. On Dec. 17, 2018, the PD-1 antibody drug "toripalimab injection" of Junshi Biosciences is approved to be marketed by the National Medical Products Administration (NMPA) of China, and it is used for treating unresectable or metastatic melanoma which fails a previous systemic treatment.

Definitions and Description

Unless otherwise stated, the following terms used in the present application shall have the following meanings. A certain term, unless otherwise specifically defined, should not be considered uncertain or unclear, but construed according to its common meaning in the field. When referring to a trade name, it is intended to refer to its corresponding commercial product, composition or its active ingredient.

As used herein, the term "antibody" refers to a binding protein having at least one antigen-binding domain. The antibody and the fragment thereof disclosed herein can be an intact antibody or any fragment thereof. Thus, the antibody and the fragment thereof disclosed herein include a monoclonal antibody or a fragment thereof and an antibody variant or a fragment thereof, as well as an immunoconjugate. Examples of the antibody fragment include a Fab fragment, a Fab' fragment, an F(ab)' fragment, a Fv fragment, an isolated CDR region, a single chain Fv molecule (scFv), and other antibody fragments known in the art. The antibody and the fragment thereof may also include a recombinant polypeptide, a fusion protein, and a bispecific antibody. The anti-PD-1/PD-L1 antibody and the fragment thereof disclosed herein can be of IgG1, IgG2, IgG3 or IgG4 isotype.

The term "isotype" refers to the class of antibodies encoded by the heavy chain constant region gene. In one embodiment, the anti-PD-1/anti-PD-L1 antibody and the fragment thereof disclosed herein are of the IgG1 or IgG4 isotype. The anti-PD-1/PD-L1 antibody and the fragment thereof disclosed herein can be derived from any species including, but not limited to, mouse, rat, rabbit, primate, llama and human. The PD-1/PD-L1 antibody and the fragment thereof can be a chimeric antibody, a humanized antibody or an intact human antibody.

The term "humanized" means that in an antibody, the antigen-binding site is derived from a non-human species and the variable region framework is derived from human immunoglobulin sequences. The humanized antibody can comprise substitutions in the framework regions such that the framework may not be an exact copy of the expressed human immunoglobulin or germline gene sequence.

The "isolated antibody" refers to an antibody that is substantially free of other antibodies having different antigenic specificities (e.g., an isolated antibody that specifically binds to PD-1/PD-L1 is substantially free of antibodies that specifically bind to antigens apart from PD-1/PD-L1). However, an isolated antibody that specifically binds to PD-1/PD-L1 may have cross-reactivity with other antigens (such as PD-1/PD-L1 molecules from different species). Furthermore, the isolated antibody may be substantially free of other cellular materials and/or chemicals.

The term "monoclonal antibody" ("mAb") refers to an antibody molecule of a single molecule composition. A monoclonal antibody composition exhibits a single binding specificity and affinity for a particular epitope or, in the case of bispecific monoclonal antibody, a dual binding specificity for two different epitopes. mAb is an example of the isolated antibody. mAbs can be produced by hybridoma techniques, recombinant techniques, transgenic techniques, or other techniques known to those skilled in the art. Examples of isolated monoclonal antibodies include, but are not limited to, nivolumab (Opdivo®), pembrolizumab (Keytruda®), toripalimab (JS-001, Junshi Biosciences), sintilimab (IBI308, Innovent Biologics), camrelizumab (SHR-1210, Hengrui Medicine, see CN105026428B or WO2015085847A1), tislelizumab (BGB-A317, BeiGene), AK105 (Akeso Bioscience), genolimzumab (GB226, Genor Biopharma), lizumab (LZM009, Livzon), HLX-10 (Henlius), BAT-1306 (Bio-Thera), HX008 (AK103, Akeso Bioscience/Hanzhong Pharmaceuticals), AK104 (Akeso Bioscience), CS1003 (CStone Pharmaceuticals), SCT-I10A (SinoCellTech), F520 (Shandong New Time Pharmaceutical/Lunan Pharmaceutical Group), SG001 (Sumgen Bio), GLS-010 (Goloria Pharceuticals), atezolizumab (Tecentriq®, Roche), avelumab (Bavencio®, Merck/Pfizer), durvalumab (Imfinzi®, AstraZeneca), KL-A167 (Kelun Pharmaceutical), SHR-1316 (Hengrui Medicine), BGB-333 (BeiGene), JS003 (Junshi Biosciences), STI-A1014 (ZKAB0011, Zhaoke Pharmaceutical), KN035 (Alphamab Oncology/3D Medicines), MSB2311 (Mabspace Biosciences), HLX-20 (Henlius), CS-1001 (CStone Pharmaceuticals), etc.

An "antigen-binding portion" (also referred to as an "antigen-binding fragment") of an antibody refers to one or more fragments of the antibody that retain the ability to specifically bind to an antigen bound to by an intact antibody.

As used herein, the term "subject" means a mammal, such as a rodent, feline, canine, and primate. Preferably, the subject according to the present application is a human.

"Administer", "administration" and "administering" refer to physically introducing the composition comprising a therapeutic agent to an entity using any of a variety of methods and delivery systems known to those skilled in the art. Routes of administration of immune checkpoint inhibitors (e.g., an anti-PD-1 antibody or an anti-PD-L1 antibody) include intravenous, intramuscular, subcutaneous, intraperitoneal, spinal, or other parenteral routes of administration, for example, by injection or infusion. The phrase "parenteral administration" used herein refers to modes of administration apart from enteral and topical administration, typically by injection, including but not limited to, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion and in vivo electroporation. In certain embodiments, the immune checkpoint inhibitor (e.g., an anti-PD-1 antibody or an anti-PD-L1 antibody) is administered by a non-parenteral route; in some embodiments, the inhibitor is administered orally. Other non-parenteral routes include topical, epidermal or mucosal routes of administration, for example, intranasal, vaginal, rectal, sublingual or local administration. Administration may also be performed, e.g., once, multiple times, and/or over one or more extended periods of time.

"Programmed death receptor-1 (PD-1)" refers to an immunosuppressive receptor belonging to the CD28 family. PD-1 is expressed primarily on previously activated T cells in vivo and binds to two ligands PD-L1 and PD-L2. As used herein, the term "PD-1" includes human PD-1 (hPD-1); variants, homologs and species homologs of hPD-1; and analogs having at least one common epitope with hPD-1.

"Programmed death ligand-1 (PD-L1)" is one of two cell surface glycoprotein ligands for PD-1 (the other is PD-L2), which down-regulates T cell activation and cytokine secretion upon binding to PD-1.

"Entity" includes any human or non-human animal. The term "non-human animal" includes, but is not limited to, vertebrates such as non-human primates, sheep, dogs, and rodents such as mice, rats and guinea pigs. In certain embodiments, the entity is a human. The terms "entity," "patient" and "subject" can be used interchangeably herein in certain contexts.

A "therapeutically effective amount" or "therapeutically effective dose" of a drug or therapeutic agent is any amount of a drug that, when used alone or in combination with another therapeutic agent, protects an entity from the onset of a disease or promotes disease regression as evidenced by reduction in the severity of disease symptoms, increase in the frequency and duration of disease symptom-free stage, or the prevention of damage or disability caused by the affliction of the disease. The ability of a therapeutic agent to promote disease regression can be evaluated using a variety of methods known to skilled practitioners, such as in a human entity during clinical trials, in an animal model system that predicts efficacy for humans, or by determining the activity of the drug in an in vitro assay.

A "recurrent" cancer is one that regenerates at the initial site or a distant site after being responsive to initial treatment (e.g., surgery). A "locally recurrent" cancer is one that occurs, after treatment, at the same location as the previously treated cancer.

An "unresectable" cancer is one that cannot be removed by surgery.

A "metastatic" cancer refers to one that spreads from one part of the body (e.g., the lungs) to another part of the body.

The use of alternatives (e.g., "or") shall be understood to refer to any one, two, or any combination of the alternatives. As used herein, the indefinite articles "a" or "an" shall be understood to mean "one or more" of any listed or enumerated components.

In the present application, anlotinib refers to the compound of formula I in any case.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" includes salts formed by basic radicals and free acids and salts formed by acidic radicals and free bases, such as hydrochloride, hydrobromide, nitrate, sulfate, phosphate, formate, acetate, trifluoroacetate, fumarate, oxalate, maleate, citrate, succinate, mesylate, benzenesulfonate and p-methylbenzenesulfonate, preferably, hydrochloride, hydrobromide, sulfate, formate, acetate, trifluoroacetate, fumarate, maleate, mesylate, p-methylbenzenesulfonate, sodium salt, potassium salt, ammonium salt, amino acid salt, etc. In the present application, when forming a pharmaceutically acceptable salt, the free acid and the basic radical are in a molar ratio of about 1:0.5 to 1:8, preferably 1:0.5, 1:1, 1:2, 1:3, 1:4, 1:5, 1:6, 1:7 or 1:8. In the present application, when forming a pharmaceutically acceptable salt, the free base and the acidic radical are in a molar ratio of about 1:0.5 to 1:8, preferably 1:0.5, 1:1, 1:2, 1:3, 1:4, 1:5, 1:6, 1:7 or 1:8.

The term "fixed combination" refers to administration of the active components (for example, the anti-PD-1/PD-L1 antibody, or the compound of formula I or the pharmaceutical acceptable salt thereof) to a subject simultaneously at a fixed total dose or in a fixed dose proportion, or in the form of a single substance, pharmaceutical composition or formulation.

The term "non-fixed combination" refers to simultaneous, parallel, or sequential and temporally unlimited administration of two or more aforementioned active components as independent substances (for example, a pharmaceutical composition and a formulation) to a subject, wherein the active components administered to the subject reach therapeutically effective amounts. An example, which can be enumerated, of the non-fixed combination is a cocktail therapy, for example, 3 or more active components are administered. In a non-fixed combination, each active component can be packaged, sold or administered as a fully independent pharmaceutical composition. The "non-fixed combination" further includes combined use of "fixed combinations", or a "fixed combination" and an independent substance of any one or more active ingredients.

As used herein, "combination use" or "use in combination" means that two or more active substances may be administered to a subject as a mixture, simultaneously as a single formulation, or sequentially in any order as a single formulation.

The term "pharmaceutical composition" refers to a mixture consisting of one or more of the active ingredients (e.g., an anti-PD-1/PD-L1 antibody, or a compound of formula I or a pharmaceutically acceptable salt thereof) disclosed herein or the pharmaceutical combinations thereof and a pharmaceutically acceptable excipient. The pharmaceutical composition is intended to facilitate the administration of the compound or the pharmaceutical combination thereof to a subject.

As used herein, the term "progression-free survival (PFS)" is defined as the time period from the first administration until objective progression of the tumor or death.

The term "complete response (CR)" means that all target lesions disappear, and the short diameter of all pathological lymph nodes (including target and non-target nodes) must be reduced to <10 mm.

The term "partial response (PR)" means that the sum of the diameters of target lesions is reduced by at least 30% from the baseline level.

The term "progressive disease (PD)" means that the sum of the diameters is relatively increased by at least 20% with reference to the minimum of the sum of the measured diameters of all target lesions throughout the study (or with reference to the baseline if the baseline measurement is minimal).

The term "stable disease (SD)" means that the target lesions are neither sufficiently reduced to level of PR nor sufficiently increased to level of PD, but somewhere in between.

The term "objective response rate (ORR)" refers to the sum of the proportion of complete response and that of partial response, i.e., ORR=CR+PR.

The term "clinical benefit rate (CBR)" refers to the proportion of subjects who achieve complete response (CR), partial response (PR) or stable disease (SD) according to RECIST version 1.1 criteria.

The term "overall survival (OS)" is defined as the time period from the first administration to death due to any cause, and expressed in days. For subjects who are lost to follow-up, the time of the last follow-up is typically regarded as the death time.

The term "RECIST" refers to response evaluation criteria in solid tumor.

The term "ECOG" refers to a simplified performance status scale established by the Eastern Cooperative Oncology Group (ECOG) of the United States.

As used herein, unless otherwise stated, the terms "comprise", "comprises" and "comprising" or equivalents thereof are open-ended statements and mean that elements, components and steps that are not specified may be included in addition to those listed.

All patents, patent applications and other identified publications are expressly incorporated herein by reference for the purpose of description and disclosure. These publications are provided solely because they were disclosed prior to the filing date of the present application. All statements as to the dates of these documents or description as to the contents of these documents are based on the information available to the applicant and do not constitute any admission as to the correctness of the dates of these documents or the content of these documents. Moreover, in any country or region, any reference to these publications herein is not to be construed as an admission that the publications form part of the commonly recognized knowledge in the art.

Administration

The content below is not intended to limit the manner of administration of the pharmaceutical combination disclosed herein.

The components in the pharmaceutical combination disclosed herein can be formulated separately, or some or all of the components are co-formulated. In one embodiment, the pharmaceutical combination disclosed herein can be formulated into a pharmaceutical composition which is suitable for a single dose or multiple doses.

The components in the pharmaceutical combination disclosed herein can be administered separately, or some or all of the components are co-administered. The components in the pharmaceutical combination disclosed herein can be administered in a substantially asynchronous manner, or some or all of the components are administered in a substantially synchronous manner.

The components in the pharmaceutical combination disclosed herein can be administered independently, or some or all of the components are co-administered in various proper routes, including, but not limited to, oral administration or parenteral administration (by intravenous, intramuscular, topical or subcutaneous routes). In some embodiments, the components in the pharmaceutical combination disclosed herein can be administered independently, or some or all of the components are co-administered by means of oral administration or injection, for example, intravenous injection or intraperitoneal injection.

The components in the pharmaceutical combination disclosed herein can be independent suitable dosage forms, or some or all of the components are co-formulated in a suitable dosage form including, but not limited to, tablet, lozenge, pill, capsule (for example, hard capsule, soft capsule, enteric capsule and microcapsule), elixir, granule, syrup, injection (intramuscular, intravenous and intraperitoneal), granule, emulsion, suspension, solution, dispersant and dosage forms of slow-released preparations for oral or non-oral administration.

The components in the pharmaceutical combination disclosed herein can be formulated independently, or some or all of the components are co-formulated with a pharmaceutically acceptable carrier and/or excipient.

The pharmaceutical combination disclosed herein may further comprise an additional therapeutic agent. In one embodiment, the additional therapeutic agent can be a known cancer therapeutic agent in the art, preferably a soft tissue carcinosarcoma therapeutic agent.

DETAILED DESCRIPTION

The present application is further described below with reference to specific examples. However, these examples are only illustrative and not intended to limit the scope of the present application. Likewise, the present application is not limited to any particular preferred embodiment described herein. It should be appreciated by those skilled in the art that equivalent substitutions or corresponding modifications for the technical features of the present application still fall with the scope of the present application. Unless otherwise specified, the reagents used in the following examples are commercially available products, and the solutions can be prepared by conventional techniques in the art.

Example 1: Combination Therapy with Anlotinib Hydrochloride for Treatment of Undifferentiated Pleomorphic Sarcoma Research on the combination of anlotinib hydrochloride and toripalimab for use in treating undifferentiated pleomorphic sarcoma was carried out, and the main target group was patients with undifferentiated pleomorphic sarcoma that was unresectable by surgery or was metastatic.

The primary research endpoint: PFS [time limit: 3 months after implementation of therapeutic protocol]; secondary research endpoints: ORR [time limit: 3 months, 6 months and 12 months after the start of treatment], CBR [time limit: 3 months, 6 months and 12 months after start of treatment], OS [time limit: research ending, average of 12 months], and safety and toxicity [time limit: until 30 days after the end of treatment].

The key inclusion criteria are as follows: patients with histologically confirmed sarcoma, only histologically high-grade pleomorphic undifferentiated sarcoma that was untreated and for which first-line standard chemotherapy was rejected, the presence of measurable lesions that met RECIST 1.1 criteria, 0-1 points for ECOG physical condition, and no possibility of complete surgical resection of lesions.

Administration Dose of Drug: Anlotinib

Anlotinib hydrochloride capsule (anlotinib dihydrochloride as the active ingredient): for the first cycle of treatment (28 days), anlotinib hydrochloride was orally administered to a patient before breakfast at 12 mg/day (once daily, 1 capsule each time), and the administration was performed for 2 weeks consecutively and then interrupted for 2 weeks; subsequent cycles of treatment each consisted of 3 weeks (21 days), and the administration was performed for 2 weeks consecutively and then interrupted for 1 week.

Administration Dose of Antibody Drug: Toripalimab

Toripalimab was administered intravenously at a dose of 240 mg. For the first cycle of treatment (28 days), the administration time was on day 8; for each subsequent cycle of treatment (21 days), the administration time was on day 1, i.e., injection every 21 days.

After an initial safety assessment of the patient, self dose escalation research of anlotinib in combination with toripalimab would be performed.

Preliminary results show that the combination of anlotinib hydrochloride and toripalimab is effective in treating undifferentiated pleomorphic sarcoma.

Patient Case

A female, aged 72, with no smoking history, had left thigh lump resection in May 2018, pathologically diagnosed as malignant tumor of left thigh, had enlarged resection after soft tissue lump resection on Aug. 30, 2018; clinical diagnosis: left thigh undifferentiated sarcoma, and double lung metastatic tumor after the second surgery for the left thigh undifferentiated sarcoma.

Administration: anlotinib (12 mg, p.o., qd, two week treatment from d1-d14 and then one-week interruption) in combination with toripalimab (240 mg, once every 21 days).

Time of first administration was Nov. 22, 2019. The sum of diameters of measurable target lesions was 44.3 mm (32.3 mm for the inferior lobe of left lung and 12.0 mm for the middle lobe of right lung). The patient was evaluated as SD in all three efficacy evaluations. Progression-free survival PFS was approximately 5 months. The therapeutic protocol and efficacy evaluations are shown in Table 1 below.

According to the content disclosed herein, the compositions and methods of the present application have been described in terms of preferred embodiments. However, it will be apparent to those skilled in the art that variations may be applied to the compositions and/or methods and the steps or the sequence of steps of the methods described herein without departing from the concept, spirit and scope of the present application.

The disclosed content of all documents cited herein are hereby incorporated by reference to the extent that they provide exemplary, procedural and other details supplementary to those described herein.

The invention claimed is:

1. A method for treating a soft tissue sarcoma, comprising administering to a subject in need thereof a therapeutically effective amount of a compound of formula I or a pharmaceutically acceptable salt thereof, and a therapeutically effective amount of toripalimab, wherein the soft tissue sarcoma is undifferentiated pleomorphic sarcoma:

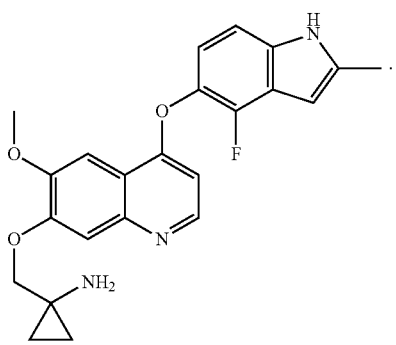

formula I

2. The method according to claim 1, wherein the soft tissue sarcoma is a recurrent soft tissue sarcoma.

3. The method according to claim 1, wherein the soft tissue sarcoma is selected from the group consisting of a primary soft tissue sarcoma, a secondary soft tissue sarcoma, a soft tissue sarcoma that has progressed or recurred after being treated with at least one chemotherapy, a soft tissue

TABLE 1

| Cycle | Administration regimen | Target lesion | Efficacy evaluation |
|---|---|---|---|
| Before the first administration | — | Sum: 44.3 mm (32.3 mm for the inferior lobe of left lung, and 12.0 mm for the middle lobe of right lung) | |
| Cycle 1 (28 days for one cycle) | Anlotinib (d 1-d 14) + toripalimab (d 8) | Sum: 40.4 mm (29.4 mm for the inferior lobe of left lung, and 11.0 mm for the middle lobe of right lung) | SD |
| Cycle 2 (21 days for one cycle) | Anlotinib (d 1-d 14) + toripalimab (d 1) | Sum: 40 mm (28.0 mm for the inferior lobe of left lung, and 12.0 mm for the middle lobe of right lung) | SD |
| Cycle 3 (21 days for one cycle) | Anlotinib (d 1-d 14) + toripalimab (d 1) | Sum: 33.3 mm (22.3 mm for the inferior lobe of left lung, and 11.0 mm for the middle lobe of right lung) | SD |
| Cycle 4 (21 days for one cycle) | Anlotinib (d 1-d 14, dose reduced to 10 mg) + toripalimab (d 1) | | | sarcoma that is intolerant to chemotherapy, a soft tissue sarcoma that has not previously been systemically treated, and a soft tissue sarcoma that has not previously been treated with a tyrosine kinase inhibitor, an inhibitor for interaction between PD-1 receptor and its ligand PD-L1, or a cytotoxic T-lymphocyte antigen 4 inhibitor.

4. The method according to claim 1, wherein the subject has not previously been treated with systemic chemotherapy, or the subject has previously been treated with surgery, radiation therapy, induction chemotherapy, concurrent chemotherapy or adjuvant chemotherapy, or the subject has not previously been treated with systemic chemotherapy but has been treated with surgery, radiation therapy, induction chemotherapy, concurrent chemotherapy or adjuvant chemotherapy, or the subject has recurrence of disease progression after achieving complete response following surgery, radiation therapy, induction chemotherapy, concurrent chemotherapy or adjuvant chemotherapy, or the subject has failed to achieve complete response or partial response following surgery, radiation therapy, induction chemotherapy, concurrent chemotherapy or adjuvant chemotherapy, or cancer of the subject metastasized after the soft tissue sarcoma has been treated with surgery, radiation therapy, induction chemotherapy, concurrent chemotherapy or adjuvant chemotherapy.

5. The method according to claim 1, wherein toripalimab is administered once a week, once every 2 weeks, once every 3 weeks or once every 4 weeks; and the compound of formula I or the pharmaceutically acceptable salt thereof is administered at a dose of 6 mg, 8 mg, 10 mg or 12 mg once daily.

6. The method according to claim 1, comprising administering: (i) a pharmaceutical composition of the compound of formula I or the pharmaceutically acceptable salt thereof in a single dose of 6 mg, 8 mg, 10 mg or 12 mg, and (ii) a pharmaceutical composition of toripalimab in a single dose of 120-600 mg.

7. The method according to claim 1, wherein the compound of formula I or the pharmaceutically acceptable salt thereof is administered in an intermittent regimen of alternate treatment and interruption periods; wherein the ratio of the treatment period to the interruption period in days is 2:0.5-2:5, 2:0.5-2:3, 2:0.5-2:2, or 2:0.5-2:1; and wherein the intermittent regimen is in one of the following cycles: consecutively 2-week treatment and then 2-week interruption, consecutively 2-week treatment and then 1-week interruption, and consecutively 5-day treatment and then 2-day interruption.

8. The method according to claim 1, comprising administering: (i) a pharmaceutical composition of the compound of formula I or the pharmaceutically acceptable salt thereof in a single dose of 6 mg, 8 mg, 10 mg or 12 mg, and (ii) a pharmaceutical composition of toripalimab in a single dose of 240 mg.

9. The method according to claim 1, comprising administering: (i) a pharmaceutical composition of the compound of formula I or the pharmaceutically acceptable salt thereof in a single dose of 6 mg, 8 mg, 10 mg or 12 mg for 14 consecutive days, and (ii) a pharmaceutical composition of toripalimab at an amount of 240 mg in a single dose or multiple doses at first administration.

10. The method according to claim 1, wherein the pharmaceutically acceptable salt is an inorganic acid salt selected from the group consisting of hydrochloric acid, hydrobromic acid, sulfuric acid, nitric acid and phosphoric acid, or the pharmaceutically acceptable salt is an organic acid salt selected from the group consisting of acetic acid, trifluoroacetic acid, propionic acid, hexanoic acid, heptanoic acid, cyclopentane propionic acid, glycolic acid, pyruvic acid, lactic acid, malonic acid, succinic acid, malic acid, maleic acid, fumaric acid, tartaric acid, citric acid, benzoic acid, cinnamic acid, mandelic acid, methanesulfonic acid, ethanesulfonic acid, 1,2-ethanedisulfonic acid, 2-hydroxyethanesulfonic acid, benzenesulfonic acid, p-chlorobenzenesulfonic acid, p-toluenesulfonic acid, 3-phenylpropionic acid, trimethylacetic acid, t-butylacetic acid, dodecyl sulfuric acid, gluconic acid, glutamic acid, hydroxynaphthoic acid, salicylic acid, and stearic acid.

11. The method according to claim 1, wherein the pharmaceutically acceptable salt is in the form of a dihydrochloride.

12. The method according to claim 1, wherein the soft tissue sarcoma is a metastatic soft tissue sarcoma.

13. The method according to claim 1, wherein the soft tissue sarcoma is a refractory soft tissue sarcoma.

14. The method according to claim 1, wherein the soft tissue sarcoma is an unresectable soft tissue sarcoma.

15. The method according to claim 1, wherein the soft tissue sarcoma is an advanced soft tissue sarcoma.

* * * * *